Jan. 8, 1963 R. D. CASSELL 3,072,144
VALVE WITH DAMPING SYSTEM
Filed May 25, 1961
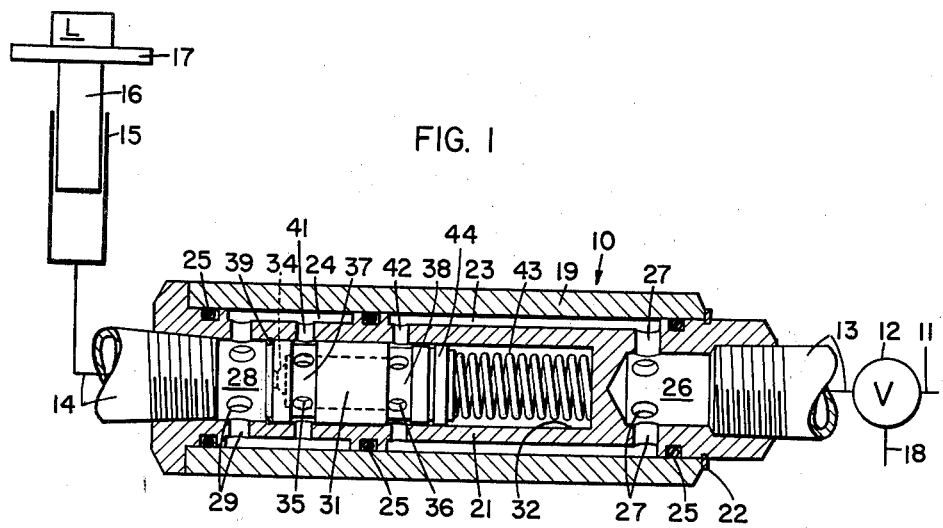
FIG. 1
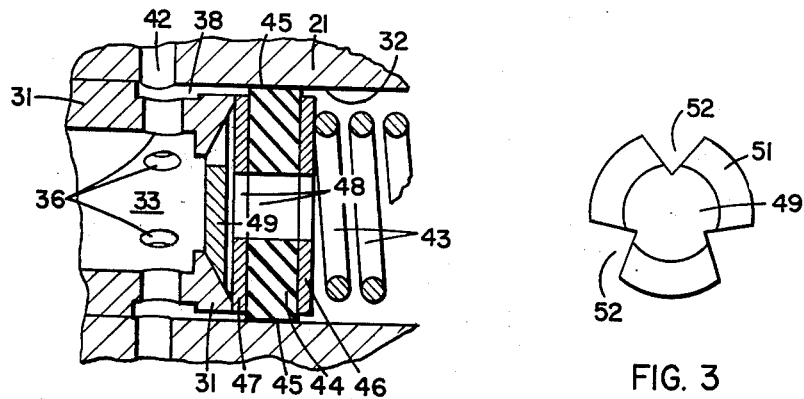
FIG. 2
FIG. 3
INVENTOR.
ROBERT D. CASSELL
BY *Richard W. Treverton*
ATTORNEY

United States Patent Office 3,072,144
Patented Jan. 8, 1963

3,072,144
VALVE WITH DAMPING SYSTEM
Robert D. Cassell, Inkster, Mich., assignor to Flowmatic Controls Incorporated, Birmingham, Mich., a corporation of Michigan
Filed May 25, 1961, Ser. No. 112,705
11 Claims. (Cl. 137—514.5)

The present invention relates to an hydraulic valve having an improved system for damping the movements of the control piston of the valve.

A valve in accordance with the invention comprises a body having a cylindrical bore therein, a piston reciprocable in the bore by hydraulic pressure and spring force, said piston controlling valve ports in the body, a spring in one end of the bore arranged to act on the piston, a damper comprising a resilient disc disposed between the piston and spring, there being clearance for fluid flow past the disc between the bore in the body and the periphery of the disc in one condition of axial compression of the disc, and the disc being adapted to expand diametrically upon greater axial compression incident to increase in compression of the spring resulting from motion of the piston in one direction in the bore.

A preferred embodiment of the invention is shown in the accompanying drawings, wherein:

FIG. 1 is a longitudinal sectional view through a valve body, the view including schematic representations of parts of an hydraulic system controlled by the valve;

FIG. 2 is a fragmentary longitudinal section on an enlarged scale through the damper and related parts of the valve; and, FIG. 3 is an elevation, in a plane transverse of FIGS. 1 and 2, of a poppet shown in FIG. 2.

The particular hydraulically actuated valve that is illustrated, designated generally by numeral 10, is arranged to allow free flow of hydraulic fluid therethrough from a pressure line 11, manual control valve 12 and conduit 13 to a conduit 14 and lift cylinder 15, for elevating a lift piston 16 and platform 17 which may bear a load L. Upon reversal of valve 12, to connect conduit 13 to a return line 18, the load L, platform 17 and piston 16 may descend by gravity at a rate limited by the valve 10. The valve 12 may be adjusted manually to determine the rate of descent, but the valve 10, which is of the general kind disclosed in my co-pending application Serial No. 96,334, filed March 16, 1961, limits the rate to a safe maximum.

Valve 10 includes a housing 19 and a cylindrical valve body 21 held in the housing by a snap ring 22. Annular grooves 23 and 24 around the body constitute fluid passages and are sealed by flexible O-rings 25. Conduit 13 is screw-threaded to the body and opens into a chamber 26 thereof which communicates with passage 23 through radial openings 27. Conduit 14 is similarly connected to the body and opens into a chamber 28 from which radial openings 29 lead to passage 24.

A substantially cup-shaped piston 31 is slidable in a closed end bore 32 in the body. The interior 33 of the piston opens into chamber 28 through an orifice 34 in the left end wall of the piston. Radial openings 35 and 36 through the skirt of the piston lead from the interior 33 respectively to annular grooves 37 and 38 which are formed on the exterior of the piston. In the position of the piston shown, wherein it abuts a snap ring 39 held by the body 21, the grooves 37 and 38 respectively open into ports 41 and 42 which extend through the body into passages 24 and 23. A compression spring 43 in the bore 32 urges the piston to the left, toward snap ring 39.

Flow of hydraulic fluid from chamber 26 to chamber 28 is substantially free, being through openings 27, passage 23, fully open ports 42 and radial openings 36 to piston interior 33, and from the latter through orifice 34 and also through radial openings 35 and fully open ports 41, passage 24 and openings 29. Flow in the opposite direction is regulated by reason of the pressure differential against the opposite faces of piston 31, including the face at the left end of chamber 33, moving the piston to the right against the resistance of spring 43. By appropriate balancing of the spring force and the areas of orifice 34 and ports 41, 42, as described in my afore-mentioned co-pending application, the rate of flow may be made to vary as desired in relation to the load L. Preferably the rate is made somewhat lower for heavy loads than for light loads.

In order to damp surges or dynamic loads which may occur in the system, particularly if the valve 12 is handled abruptly, a damping system is provided between the piston 31 and the spring 43. The damping system of the present invention comprises a disc 44 of a relatively resilient material, of slightly smaller diameter than the bore 32 so as to provide a small annular orifice 45 between the bore or cylinder wall 32 and the periphery of the disc, for fluid flow between the groove 38 (which is connected to the piston interior 33) and the spring chamber. On each side of the disc 44 there may be a support disc of slightly smaller diameter made of metal or other relatively rigid material to prevent undue wear or distortion of the resilient disc, in the event the particular material chosen requires such protection. The disc abutting spring 43 is designated 46 while that abutting piston 31 is designated 47. The three discs have aligned apertures 48 constituting a by-pass between the piston interior and the spring chamber.

This by-pass 48 is controlled by a check valve (a further part of the damping system) consisting of a poppet 49 in the form of a thin disc having a plane face adapted to seat against the adjacent disc, to close the by-pass, and having a beveled edge 51 for seating against a similarly beveled face of the piston when the by-pass is open. The periphery of the poppet is notched, as indicated at 52, to provide for fluid passage between the piston interior and by-pass 48 when the poppet is open.

The poppet opens to allow displacement of fluid from the spring chamber, which is necessary to permit rapid movement of the piston to the right, for curbing an increasing rate of flow from conduit 14 to conduit 13. However fluid flow into the spring chamber (and hence piston movement to the left) is restricted by passage 45. This restriction increases in the presence of increasing pressure of spring 43 and hydraulic pressure by reason of the resilient disc 44, exhibiting the Poisson effect, expanding radially in response axial compression.

The degree to which this effect is obtained of course depends largely upon the material chosen for the damper disc. In a valve of the general design shown, satisfactory results have been obtained using a disc 44 of a modified fluro-carbon compound working in a valve body made of metal.

Depending upon the peripheral clearance and the thickness of the disc 44 that are chosen, and the magnitude of the dynamic loads, the damping effect may be entirely viscous, entirely frictional or partly both. That is, in the event a small peripheral clearance at 45 is maintained even under peak loads, the damping effect is entirely viscous, but if the clearance is eliminated entirely when the loads exceed a selected value, frictional damping only is obtained. In some cases it is also desirable to limit the entire elimination of viscous damping by the addition of one or more bleed notches in the edge of disc 44, in which case when the peripheral clearance is eliminated then both frictional and viscous damping are obtained.

The damping system may also be made temperature responsive to vary the restriction of orifice 45 to compensate for temperature-viscosity changes of the hydraulic fluid, by the selection for the disc 44 and the valve body 21 of materials having appropriate coefficients of thermal expansion.

Having now described a valve having the improved damping system, and its operation, what I claim as my invention is:

1. An hydraulic valve comprising a body having a cylindrical bore therein closed at one end, a piston reciprocable in the bore by spring force and hydraulic pressure, said piston controlling valve ports in the cylinder wall of the body, a spring in said one end of the bore arranged to act in compression between the body and the piston, a resilient damper disc interposed between the piston and the spring, said disc being adapted to expand diametrically upon increase in axial compression incident to increased compression of the spring, there being clearance for the flow of fluid past the disc between the cylinder wall and the periphery of the disc in the condition of compression prevailing in one position of the piston in the bore, a support disc on each side of the resilient disc, aligned openings through the piston and said disc for the through flow of fluid, and a check valve for controlling such through flow, said check valve comprising a notched poppet disc disposed in a recess in the end face of the piston immediately adjacent the resilient disc and adapted to seat upon the support disc adjacent the piston to obstruct such through flow.

2. A valve according to claim 1 in which the poppet disc has a conical edge surface, and the recess in the piston has a conical surface to seat said edge of the poppet disc when the latter is open.

3. A valve according to claim 1 in which said clearance continues at a reduced value, with resultant decrease of the rate of flow past the resilient disc, in the presence of maximum spring loads occurring during operation of the valve.

4. A valve according to claim 1 in which said clearance is of such magnitude as to be eliminated by such diametrical expansion, to thereby replace or supplement viscous dampening with frictional damping in the presence of spring or hydraulic loads occurring during operation of the valve.

5. A valve according to claim 1 in which said resilient disc has a different coefficient of thermal expansion than the cylinder wall, whereby said clearance varies in response to temperature changes.

6. An hydraulic valve comprising a body having a cylindrical bore therein, a piston reciprocable in the bore by hydraulic pressure and spring force, said piston controlling valve ports in the body, a spring in one end of the bore arranged to act on the piston, a damper comprising a resilient disc disposed between the piston and spring, there being clearance for fluid past the disc between the bore in the body and the periphery of the disc in one condition of axial compression of the disc, and the disc being adapted to expand diametrically upon greater axial compression incident to increase in compression of the spring resulting from motion of the piston in one direction in the bore.

7. A valve according to claim 6 in which there is a damper support disc disposed between the spring and the resilient disc.

8. A valve according to claim 7 in which there is a by-pass for conducting fluid between the opposite sides of the resilient disc, and a check valve for controlling said by-pass.

9. A valve according to claim 8 in which said by-pass comprises an aperture through the resilient disc.

10. A valve according to claim 9 in which there is a support disc between the resilient disc and the piston having an aperture aligned with the aperture in the resilient disc, and the check valve comprises a disc-shaped poppet disposed between the piston and the adjacent support disc, the poppet being adapted to seat on the support disc to obstruct flow of fluid through the by-pass.

11. A valve according to claim 10 in which said poppet is confined in a chamber formed by the piston and the adjacent support disc, and the piston has a fluid passage extending therethrough into said chamber.

No references cited.